(12) United States Patent
Iwama et al.

(10) Patent No.: US 8,889,291 B2
(45) Date of Patent: Nov. 18, 2014

(54) ELECTRODE AND BATTERY

(75) Inventors: Masayuki Iwama, Fukushima (JP);
Kenichi Kawase, Fukushima (JP);
Yoshikazu Kato, Fukushima (JP);
Nozomu Morita, Fukushima (JP)

(73) Assignee: Sony Corporation, Tokyo (JP)

( * ) Notice: Subject to any disclaimer, the term of this patent is extended or adjusted under 35 U.S.C. 154(b) by 1270 days.

(21) Appl. No.: 11/946,554

(22) Filed: Nov. 28, 2007

(65) Prior Publication Data

US 2008/0138716 A1    Jun. 12, 2008

(30) Foreign Application Priority Data

Dec. 6, 2006 (JP) .................. 2006-329618

(51) Int. Cl.
*H01M 4/02* (2006.01)
*H01M 4/13* (2010.01)
*H01M 6/16* (2006.01)

(52) U.S. Cl.
USPC ........ 429/211; 429/217; 429/218.1; 429/338; 429/342

(58) Field of Classification Search
CPC ....................................................... H01M 6/64
USPC ............... 429/209, 211, 217, 218.1, 338, 342
See application file for complete search history.

(56) References Cited

U.S. PATENT DOCUMENTS

| | | | |
|---|---|---|---|
| 6,193,765 B1 * | 2/2001 | Nakanishi et al. | 29/623.1 |
| 6,887,623 B2 | 5/2005 | Fujimoto et al. | |
| 7,192,673 B1 | 3/2007 | Ikeda et al. | |
| 7,326,497 B2 * | 2/2008 | Matsubara et al. | 429/231.8 |
| 7,476,464 B2 * | 1/2009 | Hirose et al. | 429/200 |
| 2007/0031733 A1 * | 2/2007 | Kogetsu et al. | 429/245 |
| 2007/0111103 A1 * | 5/2007 | Konishiike et al. | 429/245 |
| 2007/0122701 A1 * | 5/2007 | Yamaguchi | 429/218.1 |
| 2007/0128520 A1 * | 6/2007 | Konishiike et al. | 429/231.95 |
| 2007/0166613 A1 * | 7/2007 | Kogetsu et al. | 429/218.1 |

FOREIGN PATENT DOCUMENTS

| | | | |
|---|---|---|---|
| EP | 1244164 | * | 9/2002 |
| JP | 06-079066 | | 11/1994 |
| JP | 2000-251942 | | 9/2000 |
| JP | 2001338843 | | 12/2001 |
| JP | 2001345103 | | 12/2001 |
| JP | 2002313319 | | 10/2003 |
| JP | 2004207113 | | 7/2004 |
| JP | 2004-342519 | | 12/2004 |
| JP | 2005-135826 | | 5/2005 |
| JP | 2005-141992 | | 6/2005 |

(Continued)

OTHER PUBLICATIONS

Japanese Office Action (JP2006-329618) dated Dec. 9, 2009.

(Continued)

*Primary Examiner* — Ula C. Ruddock
*Assistant Examiner* — Thomas H. Parsons
(74) *Attorney, Agent, or Firm* — K & L Gates LLP

(57) ABSTRACT

A battery realizing the superior cycle characteristics is provided. An electrode includes a current collector including an active-material-layer-formation region and a flat and smooth region having a surface roughness smaller than that of the active-material-layer-formation region, and an active material layer provided in the active-material-layer-formation region of the current collector. An electrode lead is connected to the flat and smooth region.

32 Claims, 4 Drawing Sheets

(56) References Cited

FOREIGN PATENT DOCUMENTS

| | | | |
|---|---|---|---|
| JP | 2005353519 | * | 12/2005 |
| JP | 2006100255 | | 4/2006 |
| JP | 2006190635 | | 7/2006 |
| JP | 2006-286912 | | 10/2006 |
| JP | 2006294373 | | 10/2006 |
| JP | 2008010419 | | 1/2008 |
| WO | 0131723 | | 5/2001 |

OTHER PUBLICATIONS

Japanese Office Action (JP 2006-329618) dated May 19, 2009.

Notice of reasons for refusal issued in connection with Japanese Patent Application No. 2010-025789, dated Nov. 13, 2012. (4 pages).

Japanese Patent Office, Office Action issued in connection with Japanese Patent Application Serial No. 2010-025789, dated May 21, 2013. (3 pages).

Korean Office Action issued on Feb. 27, 2014 for corresponding Korean Appln. No. 10-2007-0119918.

Korean Intellectual Property Office, Notice of Reasons for Preliminary Rejection issued in connection with Korean Patent Application No. 10-2007-0119918, dated Aug. 31, 2014.(8 pages).

* cited by examiner

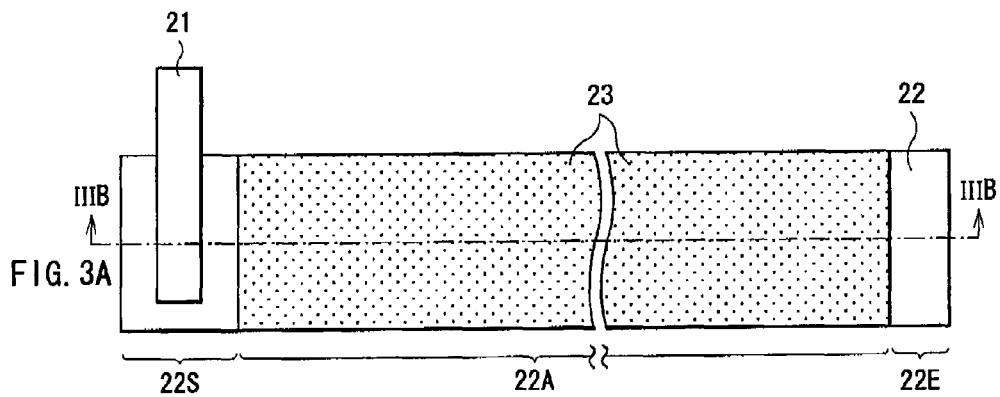
FIG. 3A
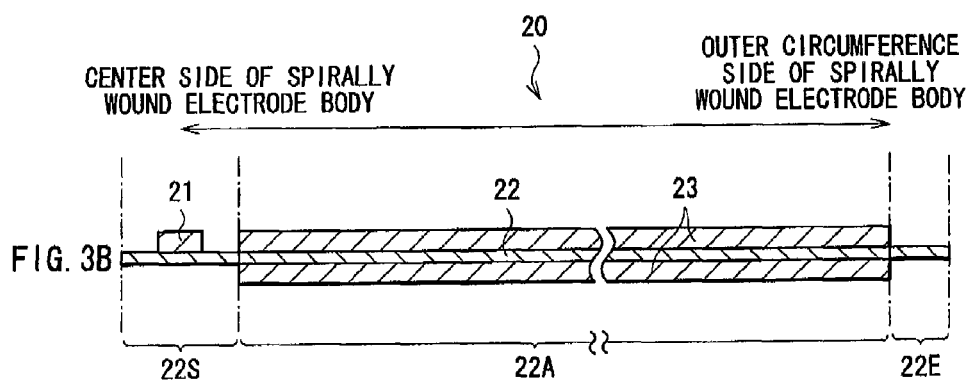
FIG. 3B
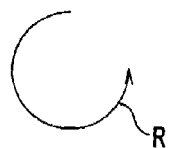

ELECTRODE AND BATTERY

CROSS REFERENCE TO RELATED APPLICATIONS

The present application claims priority to Japanese Patent Application JP 2006-329618 filed in the Japanese Patent Office on Dec. 6, 2007, the entire contents of which is being incorporated herein by reference.

BACKGROUND

The present application relates to an electrode with the superior contact characteristics between the current collector and the active material layer and a battery including the electrode.

In recent years, portable electronic devices such as combination cameras (videotape recorder), mobile phones, and portable computers have been sophisticated and multi-functionalized. Accordingly, a higher capacity of a secondary battery as a power source for these mobile devices has been demanded. Currently, a lithium ion secondary battery using graphite for the anode is generally used. However, since the technique has been matured in such a lithium ion secondary battery, the battery capacity thereof is in a saturated state and thus it is difficult to attain a vastly high capacity thereof. Therefore, it is considered to use silicon for the anode. In recent years, it has been reported that an anode active material layer is formed on an anode current collector by vapor-phase deposition method or the like. Silicon is largely expanded and shrunk due to charge and discharge, and thus it has been an issue that the cycle characteristics are lowered due to pulverization. However, by using vapor-phase deposition method, pulverization can be prevented, and the anode current collector and the anode active material layer can be integrated. In the result, electron conductivity in the anode becomes extremely favorable, and high performance both in the capacity and in the cycle life is expected.

However, even in the anode in which the anode current collector and the anode active material layer are integrated as above, the following issue exists. That is, when charge and discharge are repeated, the anode active material layer is intensely expanded and shrunk, and thus a stress is applied between the anode current collector and the anode active material layer. In the result, for example, the anode active material layer is dropped, and the cycle characteristics are lowered. Therefore, it has been already considered that by roughening the surface of the anode current collector, the contact characteristics between the anode active material layer and the anode current collector are improved (for example, refer to International Publication No. WO01/031723 and Japanese Unexamined Patent Application Publication No. 2002-313319).

However, when the surface roughness of the anode current collector is excessively increased to improve the contact characteristics between the anode active material layer and the anode current collector, the impedance is increased in the interface with an electrode lead (tab) provided in part of the surface of the anode current collector. In the result, the cycle characteristics may be deteriorated.

SUMMARY

In view of the foregoing, it is desirable to provide an electrode capable of decreasing the contact resistance between the current collector and the electrode lead while increasing the contact characteristics between the current collector and the active material layer. In the application, secondly, it is desirable to provide a battery to realize the superior cycle characteristics by including the foregoing electrode.

According to an embodiment, there is provided an electrode including a current collector including an active-material-layer-formation region and a flat and smooth region having a surface roughness smaller than that of the active-material-layer-formation region; and an active material layer provided in the active-material-layer-formation region of the current collector, wherein an electrode lead is connected to the flat and smooth region.

According to an embodiment, there is provided a battery including a cathode, an anode, and an electrolyte, wherein at least one of the cathode and the anode includes: a current collector including an active-material-layer-formation region and a flat and smooth region having a surface roughness smaller than that of the active-material-layer-formation region; and an active material layer provided in the active-material-layer-formation region of the current collector, and an electrode lead is connected to the flat and smooth region.

According to the electrode of the embodiment, the electrode lead is provided in the flat and smooth region having the surface roughness smaller than that of the active-material-layer-formation region in the current collector. Therefore, it is possible that while the contact characteristics between the current collector and the active material layer are improved by increasing the surface roughness in the active-material-layer-formation region, the contact resistance between the current collector and the anode lead is decreased. Consequently, according to the battery of the embodiment, since the battery includes the foregoing electrode, the battery characteristics such as the cycle characteristics can be improved.

Additional features and advantages are described herein, and will be apparent from, the following Detailed Description and the figures.

BRIEF DESCRIPTION OF THE FIGURES

FIGS. 3A and 3B are development elevations of an anode 20 shown in FIG. 2;

DETAILED DESCRIPTION

An embodiment will be described below in detail with reference to the drawings.

Figure 1:
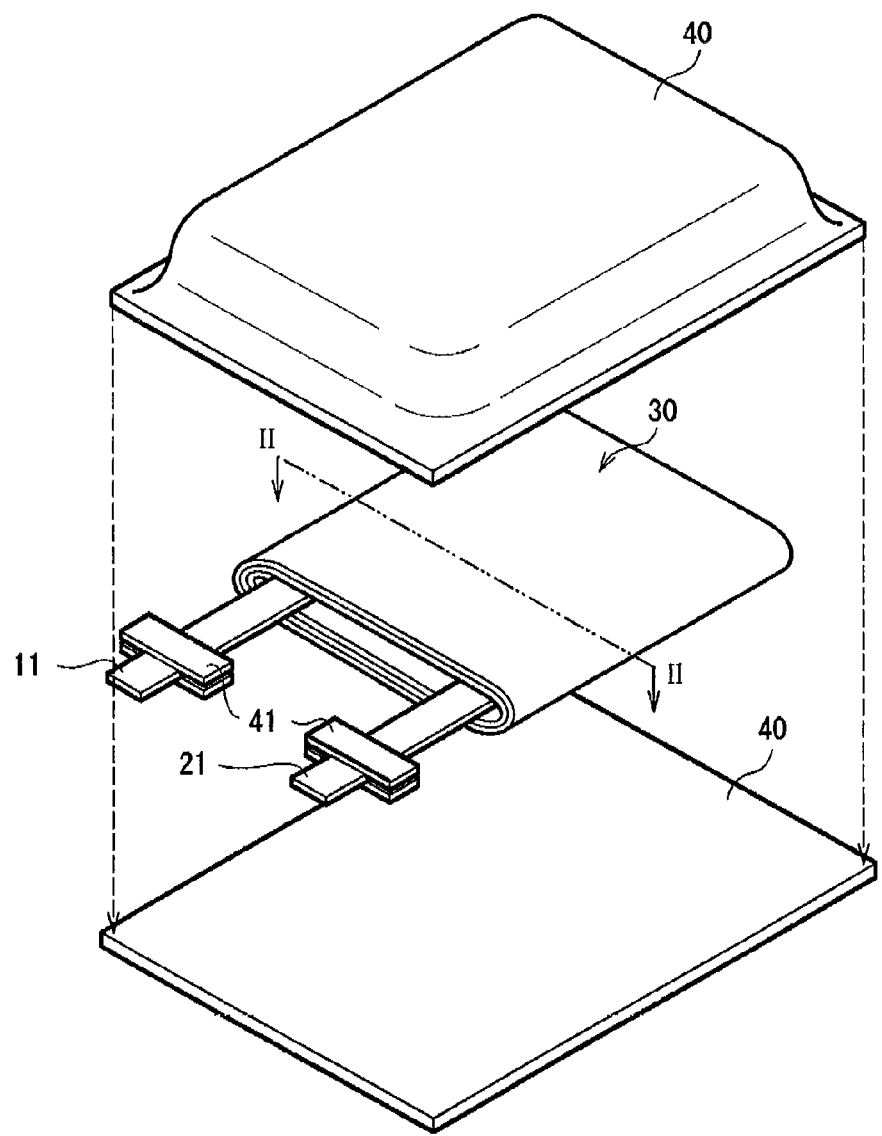
FIG. 1 is an exploded perspective view showing a structure of a secondary battery according to an embodiment.

FIG. 1 shows an exploded view of a secondary battery according to an embodiment. The secondary battery is a so-called laminated film type secondary battery. In the secondary battery, a spirally wound electrode body 30 on which a cathode lead 11 and an anode lead 21 are attached is contained inside a film package member 40. Thereby, a small, light, and thin secondary battery can be achieved.

The cathode lead 11 and the anode lead 21 are respectively directed from inside to outside of the package member 40 in the approximately same direction. The cathode lead 11 and the anode lead 21 are respectively made of, for example, a metal material such as aluminum (Al), copper (Cu), nickel (Ni), and stainless steel, and are in a state of a thin plate or mesh, respectively.

The package member 40 is made of a rectangular aluminum laminated film in which, for example, a nylon film, an aluminum foil, and a polyethylene film are bonded together in this order. The package member 40 is, for example, arranged so that the polyethylene film side and the spirally wound electrode body 30 faces each other, and the respective outer edges are contacted to each other by fusion bonding or an adhesive. Adhesive films 41 to protect from entering of outside air or the like are inserted between the package member 40 and the cathode lead 11, the anode lead 21. The adhesive film 41 is made of a material having contact characteristics to the cathode lead 11 and the anode lead 21, for example, a polyolefin resin such as polyethylene, polypropylene, modified polyethylene, and modified polypropylene.

The package member 40 may be made of a laminated film having other structure, a polymer film such as polypropylene, or a metal film, instead of the foregoing aluminum laminated film.

Figure 2:
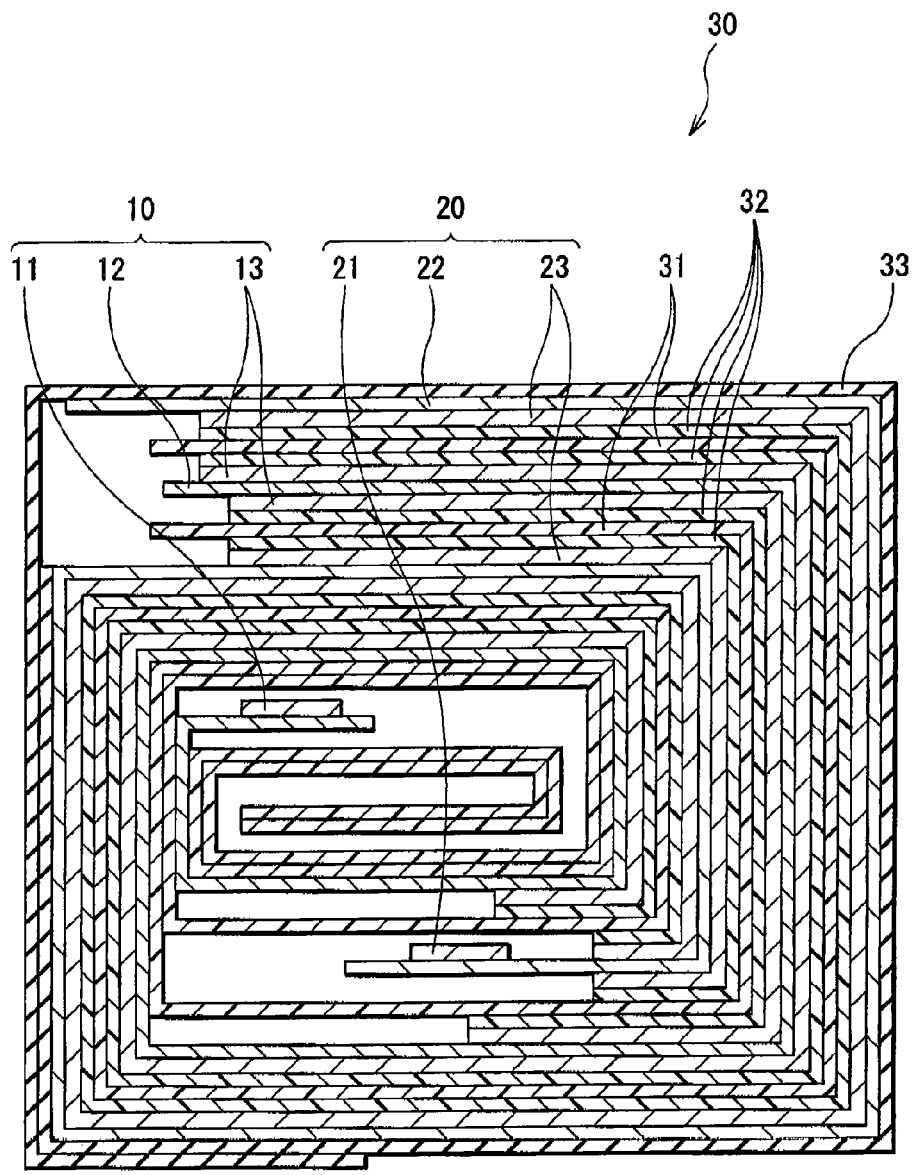
FIG. 2 is a cross section showing a structure taken along line II-II of a spirally wound electrode body shown in FIG. 1.

FIG. 2 shows a cross sectional structure taken along line II-II of the spirally wound electrode body 30 shown in FIG. 1. In the spirally wound electrode body 30, a cathode 10 and an anode 20 are layered with a separator 31 and an electrolyte layer 32 in between and spirally wound. The outermost periphery thereof is protected by a protective tape 33.

In the cathode 10, for example, a cathode active material layer 13 is provided on the both faces or a single face of a cathode current collector 12 having a pair of opposed faces. The cathode current collector 12 is made of a metal material such as aluminum, nickel, and stainless. The cathode lead 11 is provided in part of an exposed region on which the cathode active material layer 13 is not provided in the cathode current collector 12. The cathode active material layer 13 contains, for example, a cathode active material, an electrical conductor, and a binder such as polyvinylidene fluoride. As the electrical conductor, for example, a carbon material such as graphite, carbon black and Ketjen black can be cited. One thereof may be used singly, or two or more thereof may be used by mixing. In addition to the carbon material, a metal material, a conductive polymer material or the like may be used as long as the material has conductivity. As the binder, for example, a synthetic rubber such as styrene-butadiene rubber, fluorinated rubber, and ethylene propylene diene rubber; or a polymer material such as polyvinylidene fluoride can be cited. One thereof may be used singly, or two or more thereof may be used by mixing.

The cathode active material contains one or more cathode materials capable of inserting and extracting lithium as a light metal. As such a cathode material, for example, a lithium complex oxide of a sodium chloride having a bedded salt structure expressed by the general formula of $(Li_pMn_{(1-p-q-r)}Ni_qMI_rO_{2-s}F_tO_2)$ can be cited. MI in the formula represents, for example, one or more metal elements of cobalt (Co), magnesium (Mg), aluminum, boron (B), titanium (Ti), vanadium (V), chromium (Cr), iron, copper (Cu), zinc (Zn), zirconium (Zr), molybdenum (Mo), tin (Sn), calcium (Ca), strontium (Sr), and tungsten (W). p, q, r, s, and t are values in the range of $0<p\leq0.2$, $0.1\leq q\leq0.8$, $0\leq r\leq0.5$, $-0.1\leq s\leq0.2$, and $0\leq t\leq0.1$. Otherwise, a spinel type lithium complex oxide expressed by the general formula of $Li_aMn_{(2-b)}MII_bO_cF_d$ can be used as a cathode material. In the formula, MII represents one or more metal elements of cobalt, nickel, magnesium, aluminum, boron, titanium, vanadium, chromium, iron, copper, zinc, molybdenum, tin, calcium, strontium, and tungsten. a, b, c, and d are values, for example, in the range of $a\geq0.9$, $0\leq b\leq0.6$, $3.7\leq c\leq4.1$, and $0\leq d\leq0.1$. Otherwise, an olivin type lithium complex oxide expressed by the general formula of $Li_xMIIIPO_4$ can be used as a cathode material. x is, for example, a value satisfying $x\geq0.9$.

The cathode material is prepared, for example, as follows. A carbonate, a nitrate, an oxide, or a hydroxide of lithium and a carbonate, a nitrate, an oxide, or a hydroxide of a transition metal are mixed so that a desired composition is obtained. The mixture is pulverized, and then fired at a temperature in the range from 600 deg C. to 1000 deg C. in the oxygen atmosphere.

FIGS. 3A and 3B are development elevations of the anode 20 shown in FIG. 1 and FIG. 2. Specifically, FIG. 3A is a plan view, and FIG. 3B is a cross section taken along line IIIB-IIIB of FIG. 3A. As shown in FIG. 3A and FIG. 3B, the anode 20 has a structure in which an anode active material layer 23 is selectively provided on the both faces of a strip-shaped anode current collector 22. More specifically, the anode current collector 22 has a covering region 22A as a region for forming an active material layer in which the anode active material layer 23 exists on the both faces of the anode current collector 22; and exposed regions 22S and 22E as a flat and smooth region in which the anode active material layer 23 does not exist on the both faces of the anode current collector 22 and the anode current collector 22 is exposed. The exposed regions 22S and 22E are respectively located at the end on the center side of the spirally wound electrode body and the end on the outer circumference side of the spirally wound electrode body to sandwich the covering region 22A. The anode lead 21 is joined with the exposed region 22S on the central side of the spirally wound electrode body.

Figure 4:
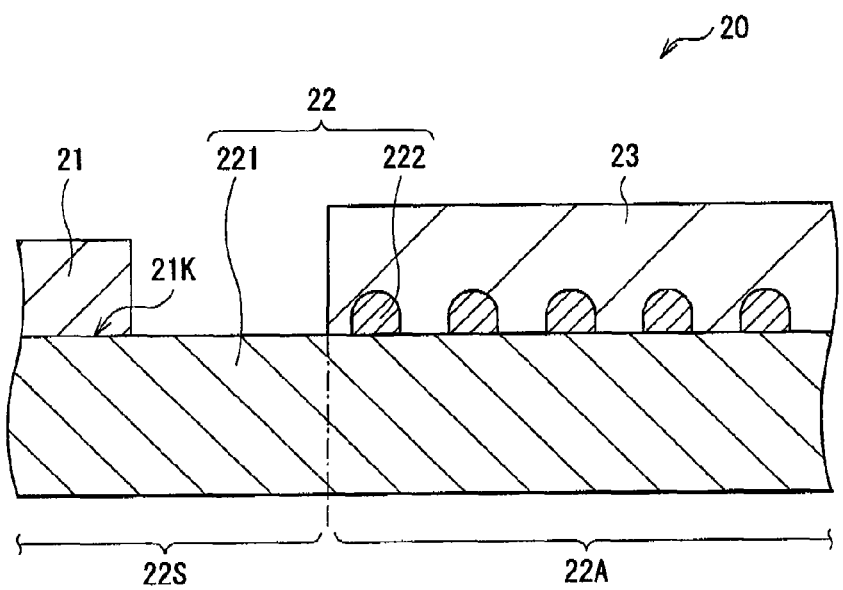
FIG. 4 is a cross section showing an enlarged main part of the anode 20 shown in FIG. 3B.

FIG. 4 is a cross section showing an enlarged main part of the anode 20 shown in FIG. 3B. FIG. 4 shows a state that the anode active material layer 23 is provided only on a single face of the anode current collector 22. The anode active material layer 23 provided on the other face is not shown in the figure. In the covering region 22A, the anode current collector 22 has a structure in which a plurality of particulate projections 222 are provided on a substrate 221. By the anchor effect of the projection 222, the contact characteristics between the anode current collector 22 and the anode active material layer 23 can be improved. The projection 222 is formed by, for example, electrolytic deposition method. The surface roughness of the anode current collector 22 in the covering region 22A provided with the projection 222 is desirably from 1.8 µm to 10.0 µm in ten point height of roughness profile Rz specified in Appendix 1 of JIS B0601. In such a range, more effective contact characteristics between the anode current collector 22 and the anode active material layer 23 can be obtained. Meanwhile, in all faces of the exposed region 22S (or at least the face with which the anode 21 is joined), the projection 222 is not provided, and the flat and smooth surface of the substrate 221 is therein exposed. Therefore, the surface roughness of the anode current collector 22 in the exposed region 22S is smaller than the surface roughness of the covering region 22A. Specifically, the surface roughness of the anode current collector 22 in the exposed region 22S is desirably 1.7 µm or less in ten point height of roughness profile Rz specified in Appendix 1 of JIS B0601. Thereby, sufficiently close joining state can be obtained in an interface 21K between the anode lead 21 and the substrate 221.

The substrate 221 is preferably made of a metal material containing a metal element not forming an intermetallic compound with lithium (Li). When the intermetallic compound is formed with lithium, the anode is expanded and shrunk due to charge and discharge, structural destruction occurs, and current collectivity is lowered. In addition, the ability to support the anode active material layer 23 is lowered. The metal material herein includes an alloy including two or more metal elements or an alloy including one or more metal elements and one or more metalloid elements, in addition to simple substances of metal elements. As the metal element not forming an intermetallic compound with lithium, for example, copper (Cu), nickel (Ni), titanium (Ti), iron (Fe), or chromium (Cr) can be cited. With the use of a metal foil containing such a metal element, favorable electrochemical stability, conductivity, and mechanical strength can be obtained.

Further, in some cases, the substrate 221 preferably contains a metal element capable of being alloyed with the anode active material layer 23. Thereby, the contact characteristics between the anode current collector 22 and the anode active material layer 23 can be more improved. Metal elements not forming an intermetallic compound with lithium and being alloyed with the anode active material layer 23, that is, as metal elements not forming an intermetallic compound with lithium and being alloyed with silicon include copper, nickel, and iron. Specially, copper is preferable in terms of the conductivity and the strength.

The substrate 221 may have a single layer structure or a multilayer structure including a plurality of layers. In the latter case, the layer contacting with the anode active material layer 23 may be made of a metal material being easily alloyed with the anode active material layer 23, and other layers may be made of other metal material.

The projection 222 is preferably provided on the surface of the substrate 221 in the covering region 22A, and preferably contains an element capable of being alloyed with the anode active material layer 23. Such alloying can further improve the contact characteristics with the anode active material layer 23. Elements that are easily alloyed with silicon include, for example, copper, nickel, iron, aluminum, indium (In), cobalt (Co), manganese (Mn), zinc (Zn), silver (Ag), tin (Sn), germanium (Ge), and lead (Pb). The element of the projection 222 may be identical with, or different from that of the substrate 221.

The shape of the projection 222 may be any shape such as a sphere and a square. The average diameter of the projection 222 is preferably from 50 nm to 5 μm, and more preferably from 100 nm to 4 μm. When the average diameter is excessively small, sufficient anchor effect is not obtained. Meanwhile, when the average diameter is excessively large, the contact characteristics between the anode current collector 22 and the anode active material layer 23 tend to be lowered.

At least part of the anode active material layer 23 is preferably formed by, for example, at least one or more methods selected from the group consisting of vapor-phase deposition method, liquid-phase deposition method, firing method, and spraying method. Two or more of these methods may be used. Thereby, deconstruction due to expansion and shrinkage of the anode active material layer 23 caused by charge and discharge can be prevented, the anode current collector 22 and the anode active material layer 23 can be integrated, and electron conductivity in the anode active material layer 23 can be improved. In "firing method," a molded layer made of a mixture of powder containing an active material and a binder is heat-treated under the non-oxidizing atmosphere or the like, and thereby a denser layer with the higher volume density than the layer before heat treatment is formed.

The anode active material layer 23 is preferably alloyed with the anode current collector 22 in at least part of the interface with the anode current collector 22. Specifically, it is preferable that at the interface thereof, the element of the anode current collector 22 is diffused in the anode active material layer 23, or the element of the anode active material layer 23 is diffused in the anode current collector 22, or both elements are diffused therein each other. Thereby, the contact characteristics can be improved, and dropping of the anode active material layer 23 from the anode current collector 22 due to expansion and shrinkage can be prevented. The foregoing diffusion of the elements is regarded as one form of alloying.

The anode active material layer 23 may have a mixture of a conductive particle and a binder. Thereby, the anode active material layer 23 can relax the stress due to its expansion and shrinkage and further improve the contact characteristics with the anode current collector 22 while securing the conductivity.

As the conductive particle, for example, a simple substance of silicon (Si), gold (Au), silver (Ag), copper, tin (Sn), bismuth (Bi), zinc (Zn), nickel, palladium (Pd), chromium (Cr), indium (In), antimony (Sb), aluminum, germanium (Ge), tungsten (W), molybdenum (Mo), manganese (Mn), titanium (Ti), and magnesium (Mg) or an alloy thereof can be cited. In particular, the conductive particle desirably contains silicon as an element. Silicon has a high ability of inserting and extracting lithium, and can provide a high energy density. As a carbon particle, for example, carbon black can be cited. The average particle diameter of the conductive particle is desirably from 0.5 μm to 5.0 μm. When the average particle diameter is excessively small, cohesion occurs, leading to fluctuation of the conductivity. Meanwhile, when the average particle diameter is excessively large, the contact characteristics between each conductive particle is lowered, leading to lowering of the conductivity.

As a binder, for example, a thermoplastic resin or a thermosetting resin can be cited. One thereof may be used singly, or two or more thereof may be used by mixing. The thermoplastic resin preferably has a functional group with hydrogen bonding, since thereby higher effects can be obtained. Such higher effects may result from the improved wettability due to hydrogen bonding with a metal. As the functional group with hydrogen bonding, for example, a hydrogen group, an amide group, a urea group, an imide group, an ester group, an ether group, a thioether group, a sulfone group, or a ketone group can be cited. As a thermoplastic resin with hydrogen bonding, for example, a phenoxy resin, thermoplastic polyurethane, polyvinyl butyral, polyamide, thermoplastic polyimide, polyamideimide, polycarbonate, polyphenlyene ether, polyvinyl ether, polysulfone, polyvinyl alcohol, polyvinylformal, polyvinyl acetate, a methacrylic resin, or an ionomer resin can be cited.

As the thermosetting resin, for example, an epoxy resin, a phenol resin, polyimide, polyurethane, a melamine resin, or a urea resin can be cited. The epoxy resin includes, for example, a bisphenol A epoxy resin, a bisphenol F epoxy resin, a novolac epoxy resin, a halogenated bisphenol epoxy resin, a resorcinol epoxy resin, a tetrahydroxyphenolethane epoxy resin, a polyalcohol polyglycol epoxy resin, a glycerin triether epoxy resin, a polyolefin epoxy resin, an epoxidized soybean oil, cyclopentadiene dioxide, or vinylcyclohexene dioxide can be cited. Specially, the bisphenol A epoxy resin and the novolac epoxy resin are preferable.

The separator 31 separates the cathode 10 from the anode 20, and passes lithium ions while preventing current short circuit due to contact of the both electrodes. The separator 31 is made of, for example, a porous film made of a synthetic resin such as polytetrafluoroethylene, polypropylene, and polyethylene, or a ceramics porous film. The separator 31 may have a structure in which two or more porous films as the foregoing porous films are layered. Specially, a polyolefin porous film is preferable since the polyolefin porous film has superior effect for preventing short circuit, and can contribute to improving battery safety by the shutdown effect. In particular, polyethylene is preferable as a material composing the separator 31, since the shutdown effect can be obtained in the range from 100 deg C. to 160 deg C., and their electrochemical stability is superior. Polypropylene is also preferable. In addition, as long as a resin has the chemical stability, the resin may be used by being copolymerized or blended with polyethylene or polypropylene.

The electrolyte layer 32 provided on the separator 31 contains an electrolytic solution in which a lithium salt as an electrolyte salt is dissolved in a liquid solvent (for example, a nonaqueous solvent such as an organic solvent).

The nonaqueous solvent contains at least one selected from the group consisting of chain ester carbonate and cyclic ester carbonate. For example, ethylene carbonate, propylene carbonate, butylene carbonate, 1,3-dioxole-2-one, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxyacetonitrile, 3-methyoxypropionitrile, N,N-dimethylformamide, N-methylpyrrolidinone, N-methyloxazolidinone, N,N'-dimethylimidazolidinone, nitromethane, nitroethane, sulfolane, dimethyl sulfoxide phosphate or the like can be cited. Thereby, superior capacity characteristics, superior high temperature storage characteristics, and superior high temperature cycle characteristics can be obtained in the electrochemical device including the electrolytic solution. One of the foregoing nonaqueous solvents may be used singly, or two or more thereof may be used by mixing. Specially, the solvent preferably contains a mixture of a high-viscosity (high dielectric constant) solvent (for example, dielectric constant ∈c≥30) such as ethylene carbonate and propylene carbonate and a low-viscosity solvent (for example, viscosity≤1 mPa*s) such as dimethyl carbonate, ethyl methyl carbonate, and diethyl carbonate. Thereby, the dissociation property of the electrolyte salt and the ion mobility are improved, and thus higher effects can be obtained.

In particular, the chain ester carbonate and cyclic ester carbonate preferably include at least one selected from the group consisting of chain ester carbonate having a halogen as an element shown in Chemical formula 1 and cyclic ester carbonate having a halogen as an element shown in Chemical formula 2. Thereby, higher effects can be obtained.

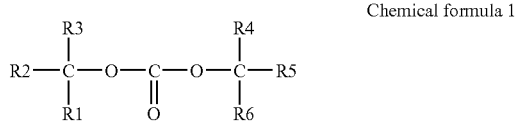

Chemical formula 1

In the formula, R1 to R6 represent a hydrogen group, a halogen group, an alkyl group, or an alkyl halide group. R1 to R6 may be identical or different. However, at least one of R1 to R6 has a halogen as an element.

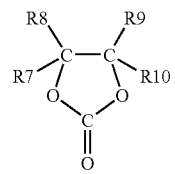

Chemical formula 2

In the formula, R7 to R10 represent a hydrogen group, a halogen group, an alkyl group, or an alkyl halide group. R7 to R10 may be identical or different. However, at least one of R7 to R10 has a halogen as an element.

The chain ester carbonate having a halogen as an element shown in Chemical formula 1 is fluoromethyl methyl carbonate, bis(fluoromethyl) carbonate, difluoromethyl methyl carbonate or the like. One thereof may be used singly, or two or more thereof may be used by mixing.

As the cyclic ester carbonate having a halogen as an element shown in Chemical formula 2, where R5 to R8 are an alkyl group or an alkyl halide group, the carbon number is preferably about 1 or 2. Specifically, compounds shown in Chemical formula 3 and Chemical formula 4 can be cited. That is, 4-fluoro-1,3-dioxolane-2-one in Chemical formula 3(1), 4-chloro-1,3-dioxolane-2-one in Chemical formula 3(2), 4,5-difluoro-1,3-dioxolane-2-one in Chemical formula 3(3), tetrafluoro-1,3-dioxolane-2-one in Chemical formula 3(4), 4-fluoro-5-chloro-1,3-dioxolane-2-one in Chemical formula 3(5), 4,5-dichloro-1,3-dioxolane-2-one in Chemical formula 3(6), tetrachloro-1,3-dioxolane-2-one in Chemical formula 3(7), 4,5-bistrifluoromethyl-1,3-dioxolane-2-one in Chemical formula 3(8), 4-trifluoromethyl-1,3-dioxolane-2-one in Chemical formula 3(9), 4,5-difluoro-4,5-dimethyl-1,3-dioxolane-2-one in Chemical formula 3(10), 4-methyl-5,5-difluoro-1,3-dioxolane-2-one in Chemical formula 3(11), 4-ethyl-5,5-difluoro-1,3-dioxolane-2-one in Chemical formula 3(12) and the like can be cited. Further, 4-trifluoromethyl-5-fluoro-1,3-dioxolane-2-one in Chemical formula 4(1), 4-trifluoromethyl-5-methyl-1,3-dioxolane-2-one in Chemical formula 4(2), 4-fluoro-4,5-dimethyl-1,3-dioxolane-2-one in Chemical formula 4(3), 4,4-difluoro-5-(1,1-difluoroethyl)-1,3-dioxolane-2-one in Chemical formula 4(4), 4,5-dichloro-4,5-dimethyl-1,3-dioxolane-2-one in Chemical formula 4(5), 4-ethyl-5-fluoro-1,3-dioxolane-2-one in Chemical formula 4(6), 4-ethyl-4,5-difluoro-1,3-dioxolane-2-one in Chemical formula 4(7), 4-ethyl-4,5,5-trifluoro-1,3-dioxolane-2-one in Chemical formula 4(8), 4-fluoro-4-methyl-1,3-dioxolane-2-one in Chemical formula 4(9) and the like can be cited. One thereof may be used singly, or two or more thereof may be used by mixing. Specially, as the cyclic ester carbonate having a halogen as an element, 4-fluoro-1,3-dioxolane-2-one in Chemical formula 3(1) is preferable, and 4,5-difluoro-1,3-dioxolane-2-one in Chemical formula 3(3) is more preferable, since such a compound is easily available and can provide higher effects. In particular, as 4,5-difluoro-1,3-dioxolane-2-one, a trans isomer is more preferable than a cis isomer to obtain higher effects.

Chemical formula 3
(1) 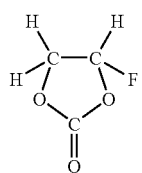
(2) 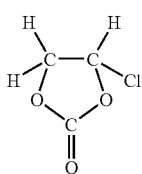
(3) 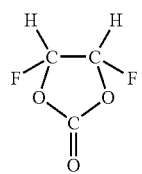
(4) 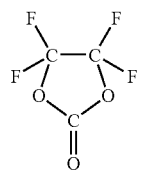
(5) 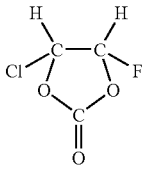
(6) 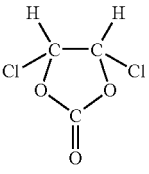
(7) 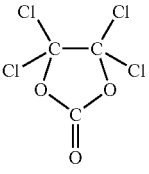
(8) 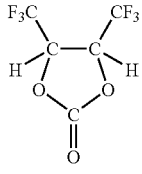
(9) 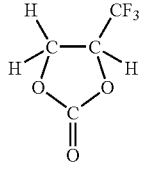
(10) 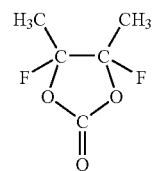
(11) 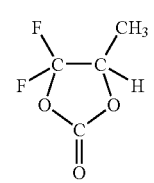
(12) 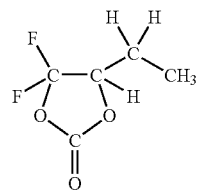
Chemical formula 4
(1) 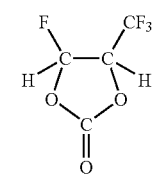
(2) 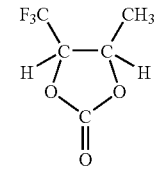
(3) 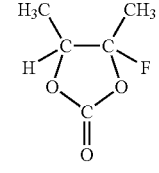
(4) 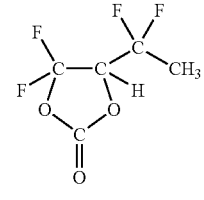
(5) 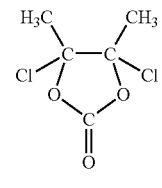

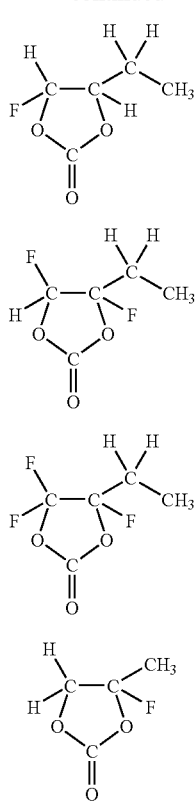

As the lithium salt, for example, an inorganic lithium salt such as lithium hexafluorophosphate (LiPF$_6$), lithium tetrafluoroborate (LiBF$_4$), lithium hexafluoroarsenate (LiAsF$_6$), lithium hexafluoroantimonate (LiSbF$_6$), lithium perchlorate (LiClO$_4$), and lithium tetrachloroaluminate (LiAlCl$_4$); or a lithium salt of derivatives of perfluoroalkanefsulfonate such as lithium trifluoromethanesulfon (CF$_3$SO$_3$Li), lithium bis (trifluoromethanesulfone)imide (CF$_3$SO$_2$)$_2$NLi), lithium bis (pentafluoroethanesulfone)imide (C$_2$F$_5$SO$_2$)$_2$NLi), and lithium tris(trifluoromethanesulfone)methide ((CF$_3$SO$_2$)$_3$CLi) can be cited. Such a lithium salt may be used singly, or two or more thereof may be used by mixing. When two or more thereof are mixed, LiPF$_6$ is desirably used as a main component. LiPF$_6$ has the high conductivity and the superior oxidation stability.

The content (concentration) of the lithium salt is preferably in the range from 0.5 mol/g to 3.0 mol/kg. If the content is out of the range, the ion conductivity is drastically lowered, and there is a possibility that sufficient battery characteristics are not able to be obtained.

The electrolyte layer 32 may be made of a gel electrolyte in which an electrolytic solution is held by a polymer compound. The polymer compound is, for example, a copolymer containing vinylidene fluoride as a component. Specifically, polyvinylidene fluoride, a copolymer containing vinylidene fluoride as a component can be cited. As a specific example of copolymers, vinylidene fluoride-hexafluoropropylene copolymer, vinylidene fluoride-tetrafluoroethylene copolymer, vinylidene fluoride-chlorotrifluoroethylene copolymer, vinylidene fluoride-hexafluoropropylene-tetrafluoroethylene copolymer, vinylidene fluoride-hexafluoropropylene-chlorotrifluoroethylene copolymer, or a copolymer obtained by further copolymerizing other ethylene unsaturated monomer with the foregoing copolymer can be cited. When vinylidene fluoride-hexafluoropropylene copolymer is used, the abundance ratio (weight ratio) of the electrolytic solution to the copolymer is desirably from 5 to 12. In addition, as the polymer compound, polyacrylonitrile, polyethylene oxide, polymethyl methacrylate, polyvinyl chloride, and their derivative can be used. One of the polymer compounds may be used singly, or two or more thereof may be used by mixing.

The secondary battery can be manufactured, for example, as follows.

First, a cathode active material, a binder, and an electrical conductor are mixed to prepare a cathode mixture. The mixture is dispersed in a solvent such as N-methyl-2-pyrrolidone, and thereby cathode mixture slurry is formed. Next, the both faces or a single face of the cathode current collector 12 is coated with the cathode mixture slurry, which is dried and compression-molded to form the cathode active material layer 13. Subsequently, the cathode lead 11 is joined to the cathode current collector 12 by ultrasonic welding, a spot welding and the like, and thereby the cathode 10 is formed.

The anode 20 is formed as follows.

First, a metal foil as the substrate 221 is prepared. The projection 222 is formed over the whole area of the metal foil by electrolytic deposition method or the like to form the anode current collector 22. Then, the electrolytic copper foil is preferably used as the substrate 221, since the anode current collector 22 can be formed easily.

Next, the anode active material layer 23 is formed in the covering region 22A of the anode current collector 22 by using vapor-phase deposition method, liquid-phase deposition method, firing method, spraying method, or two or more of these methods. As vapor-phase deposition method, for example, physical deposition method or chemical deposition method can be cited. Specifically, vacuum vapor deposition method, sputtering method, ion plating method, laser ablation method, CVD (Chemical Vapor Deposition) method and the like can be used. As liquid-phase deposition method, for example, plating can be cited.

Figure 5:
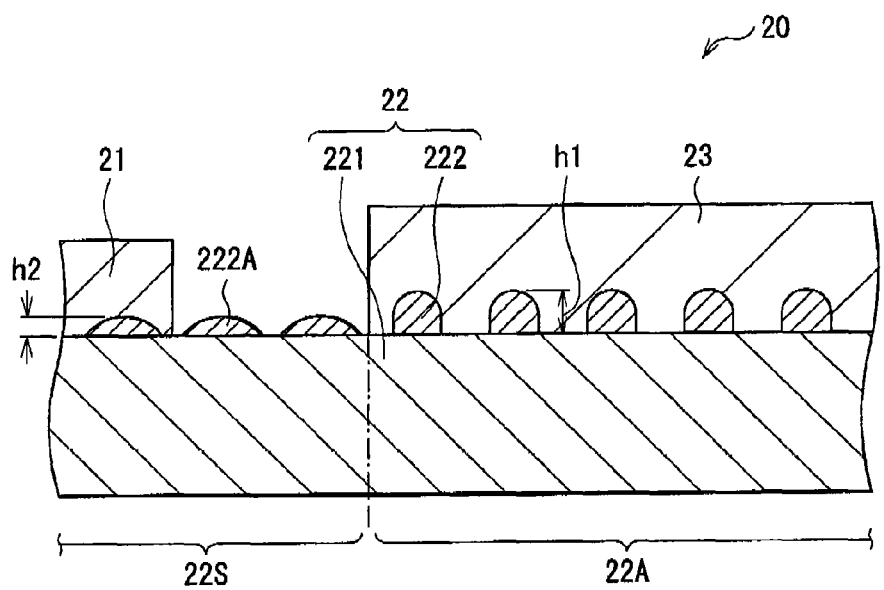
FIG. 5 is another cross section showing an enlarged main part of the anode 20 shown in FIG. 3B.

After the anode active material layer 23 is formed, the projection 222 in the exposed region 22S is compressed (plastically deformed) and planarized by a rolling press machine or the like to form the flat and smooth region. Next, the anode lead 21 is joined with the flat and smooth region in the anode current collector 22 by ultrasonic welding, spot welding or the like, and thereby the anode 20 is formed. At this time, all the exposed region 22S may be the flat and smooth region. Otherwise, at least the region with which the anode lead 21 is joined may be the flat and smooth region in the exposed region 22S. Otherwise, instead of forming the projection 222 over the whole area of the substrate 221, the projection 222 may be selectively formed only on the covering region 22A on which the anode active material layer 23 is to be formed. In this case, the press processing for forming the flat and smooth region is not necessary. In the flat and smooth region in which the electrode lead 21 is formed, the surface of the anode current collector 22 is desirably a perfect flat face. However, for example, as shown in FIG. 5, even when a deformed projection 222A remains, the after-mentioned reduction effect of contact resistance can be obtained as long as height h2 of the projection 222A is lower than height h1 of the projection 222 of the covering region 22A.

In some cases, alloying of the anode active material layer 23 and the anode current collector 22 is generated concurrently with forming the anode active material layer 23. Otherwise, it is possible that after the anode active material layer 22 is formed, heat treatment is performed under the vacuum atmosphere or under the non-oxidizing atmosphere, and thereby the anode active material layer 23 and the anode current collector 22 are alloyed. In the result, the anode 20 shown in FIGS. 3A, 3B, 4 and the like is obtained.

After that, the cathode 10 and the anode 20 are layered with the separator 31 in between and spirally wound. The protective tape 33 is adhered to the outermost periphery thereof, and a spirally wound body as a precursor of the spirally wound electrode body 30 is formed. Next, the spirally wound body is sandwiched between the package members 40, the peripheral edges other than one side are thermally fusion-bonded to obtain a pouched state, and the spirally wound body is contained inside the package member 40. An electrolytic solution is injected into the package member 40. After that, the opening of the package member 40 is hermetically sealed by thermal fusion bonding. At this time, the adhesive film 41 is inserted between the cathode lead 11, the anode lead 21 and the package member 40. Thereby, the secondary battery shown in FIG. 1 and FIG. 2 is completed.

When the electrolytic solution is held by the polymer compound, the secondary battery may be manufactured as follows. First, the precursor of the spirally wound electrode body 30 formed by the foregoing method is sandwiched between the package members 40, the peripheral edges other than one side are thermally fusion-bonded to obtain a pouched state, and the spirally wound body is contained inside the package member 40. Subsequently, a composition of matter for electrolyte containing an electrolytic solution, a monomer as a raw material for a polymer compound, and if necessary other material such as a polymerization initiator and a polymerization inhibitor is prepared, which is injected into the package member 40. After that, the opening of the package member 40 is hermetically sealed by thermal fusion bonding. After that, if necessary, the monomer is heated to be polymerized to obtain a polymer compound. Thereby, the gel electrolyte layer 32 is formed, and the secondary battery shown in FIG. 1 and FIG. 2 is assembled.

Otherwise, instead of injecting the composition of matter for electrolyte after forming the spirally wound body, for example, it is possible that a body that is spirally wound after the cathode 10 and the anode 20 are coated with the composition of matter for electrolyte is enclosed inside the package member 40, and if necessary, the resultant is heated to form the electrolyte layer 32. Otherwise, it is possible that the cathode 10 and the anode 20 are coated with the composition of matter for electrolyte, if necessary the resultant is heated to form the electrolyte layer 32, the resultant is spirally wound, and the spirally wound body is enclosed inside the package member 40. However, it is preferable that the electrolyte layer 32 is formed after the spirally wound body is enclosed inside the package member 40. Thereby, the interface joining between the electrolyte layer 32 and the separator 31 can be sufficiently improved, and the internal resistance can be prevented from being increased.

In the secondary battery, when charged, for example, lithium ions are extracted from the cathode active material layer 13 and inserted in the anode active material layer 23 through the electrolyte layer 32. When discharged, lithium ions are extracted from the anode 20 and inserted in the cathode 10 through the electrolyte layer 32. In this embodiment, the anode current collector 22 including the projection 222 in the covering region 22A is used. Therefore, the contact characteristics between the anode current collector 22 and the anode active material layer 23 are improved. Thus, even when the anode active material layer 23 is expanded and shrunk due to charge and discharge, separating or dropping of the anode active material layer 23 from the anode current collector 22 are prevented. Meanwhile, the anode lead 21 is provided in the exposed region 22S (flat and smooth region) having a flat and smooth surface in which the projection 222 is not provided. Therefore, it is possible to obtain joining state in which the anode lead 21 and the substrate 221 are sufficiently close-contacted in the interface 21K.

As described above, according to this embodiment, the projection 222 is provided on the surface of the substrate 221. Therefore, the contact characteristics between the anode current collector 22 and the anode active material layer 23 can be improved, and separating of the anode active material layer 23 can be prevented. Meanwhile, the anode lead 21 is provided in the exposed region 22S (flat and smooth region) having the surface roughness smaller than that of the covering region 22A. Therefore, the contact resistance (impedance) between the anode current collector 22 and the anode lead 21 can be decreased. Therefore, the battery characteristics such as the cycle characteristics can be improved.

EXAMPLES

Further, specific examples of the application will be hereinafter described in detail.

Examples 1-1 to 1-8

In these examples, secondary batteries corresponding to the foregoing embodiment was fabricated.

First, an electrolytic copper foil being 12 μm thick was prepared as the substrate 221, the projection 222 was formed by electrolytic deposition method, and thereby the anode current collector 22 was formed. Then, the surface roughness (ten point height of roughness profile) Rz in the covering region 22A of the anode current collector 22 was changed as shown in Table 1, and each surface roughness Rz of the both faces of the anode current collector 22 (a mat face and a shine face) was set as shown in Table 1. In the examples, the surface roughness Rz of the shine face was all 5.8 μm. In the examples, a metallic electrolytic drum is dipped in the electrolytic solution in which a copper ion was dissolved, a current was applied while rotating the electrolytic drum, and thereby the electrolytic copper foil was deposited on the surface thereof. Such a resultant electrolytic copper foil was used. The face on the side facing the electrolytic solution in the electrolytic copper foil was the mat face. The face on the side contacting with the electrolytic drum was the shine face. In the state that the surface was roughened by depositing copper particles by electrolytic processing, the copper particles were formed in a random order on the mat face side, while a streak-like concavity and convexity existing on the surface of the electrolytic drum were transcribed on the shine face side and the copper particles were arranged in rows along a certain direction on the shine face side.

Subsequently, silicon particle being 3 μm in the average particle diameter and conductive carbon particle were prepared as conductive particles, and thermoplastic polyimide was prepared as a binder. Next, 70 wt % of the silicon particle, 10 wt % of the conductive carbon particle, and 20 wt % of the thermoplastic polyimide were kneaded with the use of N-methyl-2-pyrrolidone as a solvent, and thereby anode mixture slurry was formed. The covering region 22A on the both faces of the anode current collector 22 was selectively coated with the anode mixture slurry, which was dried and press-molded by a rolling press machine to form the anode active material layer 23. Concurrently, the exposed region 22S of the anode current collector 22 was press-molded by the rolling press machine, and thereby a flat and smooth region with the surface roughness (ten point height of roughness profile) Rz of 1.7 μm was formed. After that, the anode lead 21 made of nickel was joined with the flat and smooth region of the anode current collector 22 by ultrasonic welding, and thereby the anode 20 was obtained.

Meanwhile, 92 parts by weight of lithium cobalt oxide (LiCoO2) powder being 5 μm in the average particle diameter as a cathode active material, 3 parts by weight of carbon black as an electrical conductor, and 5 parts by weight of polyvinylidene fluoride as a binder were mixed. The resultant mixture was put in N-methyl-2-pyrrolidone as a disperse medium to obtain cathode mixture slurry. Next, the cathode current collector 12 made of an aluminum foil being 15 μm thick was coated with the cathode mixture slurry, which was dried and press-molded to form the cathode active material layer 13. The cathode lead 11 made of aluminum was joined by ultrasonic welding, and thereby the cathode 10 was obtained.

After the cathode 10 and the anode 20 were formed, the cathode 10 and the anode 20 were layered with the separator 31 made of a micro-porous polypropylene film being 12 μm thick in between and spirally wound to form the spirally wound electrode body 30.

Subsequently, LiPF6 was dissolved at a concentration of 1 mol/dm3 in the mixed solvent of ethylene carbonate and diethyl carbonate at the weight ratio of ethylene carbonate:diethyl carbonate=3:7, and thereby an electrolytic solution was prepared.

Next, the spirally wound electrode body 30 was sandwiched between the package members 40 made of an aluminum laminated film. After that, the peripheral edges of the package member 40 other than one side were bonded to each other to obtain a pouched state. The cathode lead 11 and the anode lead 21 were derived outside of the package member 40.

Finally, the electrolytic solution was injected from the open side into the package member 40, the open side of the package member 40 was bonded by thermal fusion bonding, and thereby the secondary batteries of Examples 1-1 to 1-8 were obtained.

As comparative example 1-1 relative to Examples 1-1 to 1-8, a secondary battery was fabricated in the same manner as that of Example 1-5, except that the exposed region 22S was not press-molded by the rolling press machine, the large surface roughness thereof was kept, and the anode lead 21 was welded thereto. As comparative example 1-2, a secondary battery was fabricated in the same manner as that of Examples 1-1 to 1-8, except that the whole area of the anode current collector 22 was press-molded before the anode active material layer 23 was formed, and the surface roughness Rz of the mat face of the covering region 22A was also 1.7 μm.

For the fabricated secondary battery of each example and each comparative example, charge and discharge test was performed at 25 deg C., and the discharge capacity retention ratio at the 50th cycle to the second cycle was obtained. Charge was performed until the battery voltage reached 4.2 V at the constant current of 0.5 C, and then performed until the charging total time reached 3 hours at the constant voltage of 4.2 V. Discharge was performed until the battery voltage reached 2.5 V at the constant current density of 1 C. The discharge capacity retention ratio was calculated as the ratio of the discharge capacity at the 50th cycle to the discharge capacity at the second cycle, that is, as (the discharge capacity at the 50th cycle/the discharge capacity at the second cycle)× 100. Further, for the secondary battery of each example and each comparative example, the resistance between the cathode lead 11 and the anode lead 21 was measured. The results are shown in Table 1.

TABLE 1

| | Surface roughness Rz of covering region | | Surface roughness Rz of exposed region (μm) | Resistance (mΩ) | Discharge capacity retention ratio (%) |
|---|---|---|---|---|---|
| | Mat face (μm) | Shine face (μm) | | | |
| Example 1-1 | 1.8 | 5.8 | 1.7 | 78 | 69.8 |
| Example 1-2 | 2.0 | 5.8 | 1.7 | 78 | 70.5 |
| Example 1-3 | 3.2 | 5.8 | 1.7 | 78 | 72.6 |
| Example 1-4 | 5.4 | 5.8 | 1.7 | 78 | 74.2 |
| Example 1-5 | 7.4 | 5.8 | 1.7 | 78 | 76.2 |
| Example 1-6 | 8.8 | 5.8 | 1.7 | 78 | 74.1 |
| Example 1-7 | 9.9 | 5.8 | 1.7 | 78 | 72.1 |
| Example 1-8 | 10.2 | 5.8 | 1.7 | 78 | 70.0 |
| Comparative example 1-1 | 7.4 | 5.8 | 7.4 | 147 | 52.3 |
| Comparative example 1-2 | 1.7 | 5.8 | 1.7 | 78 | 58.8 |

As shown in Table 1, in Examples 1-1 to 1-8 in which the surface roughness Rz of the exposed region 22S in which the anode lead 21 was provided was 1.7 μm and the surface roughness Rz of the covering region 22A was 1.8 μm or more, relatively favorable capacity retention ratios were obtained. Meanwhile, in Comparative example 1-1, since the anode lead 21 was provided in the exposed region 22S in which the surface roughness Rz was 7.4 μm, the resistance was increased and the discharge capacity retention ratio was lowered compared to Examples 1-1 to 1-8. In Comparative example 1-2, since the surface roughness Rz of the exposed region 22S was 1.7 μm, low resistance was obtained as in Examples 1-1 to 1-8. However, in Comparative example 1-2, since the surface roughness Rz of the mat face of the covering region 22A was also 1.7 μm, the contact characteristics between the anode current collector 22 and the anode active material layer 23 were not obtained sufficiently, and the discharge capacity retention ratio was lowered compared to Examples 1-1 to 1-8. Further, from the results of Examples 1-1 to 1-8, it was found that there was a tendency that the discharge capacity retention ratio was improved as the surface roughness Rz of the mat face of the covering region 22A became larger from 1.8 μm; the discharge capacity retention ratio was the maximum when the surface roughness Rz of the mat face of the covering region 22A was 7.4 μm; and then the discharge capacity retention ratio was gradually lowered when the surface roughness Rz of the mat face of the covering region 22A became larger than 7.4 μm. The reason thereof is as follows. When the surface roughness Rz of the mat face of the covering region 22A was in the range from 1.8 μm to about 7.4 μm, effect of improvement in the contact characteristics between the anode current collector 22 and the anode active material layer 23 were sufficiently obtained due to the projection 222. However, when the projection 222 was excessively large, the projection 222 itself was easily separated from the substrate 221.

Examples 2-1 to 2-6

Secondary batteries of Examples 2-1 to 2-6 were fabricated in the same manner as that of Example 1-5, except that the surface roughness Rz of the shine face of the covering region 22A was changed as in the following Table 2, while the surface roughness Rz of the mat face of the covering region 22A was all 7.4 μm. As comparative example 2-1 relative to Examples 2-1 to 2-6, a secondary battery was fabricated in the same manner as that of Examples 2-1 to 2-6, except that the whole area of the anode current collector 22 was press-molded before the anode active material layer 23 was formed, and the surface roughness Rz of the shine face of the covering region 22A was also 1.7 μm. For the secondary batteries of Examples 2-1 to 2-6 and Comparative example 2-1, the discharge capacity retention ratio and the resistance were measured in the same manner as those of examples 1-1 to 1-8. The results are shown in Table 2 with the results of Example 1-5 and Comparative example 1-1.

TABLE 2

| | Surface roughness Rz of covering region | | Surface roughness Rz of exposed region (μm) | Resistance (mΩ) | Discharge capacity retention ratio (%) |
|---|---|---|---|---|---|
| | Mat face (μm) | Shine face (μm) | | | |
| Example 2-1 | 7.4 | 1.9 | 1.7 | 78 | 69.4 |
| Example 2-2 | 7.4 | 2.0 | 1.7 | 78 | 70.8 |
| Example 2-3 | 7.4 | 3.7 | 1.7 | 78 | 72.8 |
| Example 1-5 | 7.4 | 5.8 | 1.7 | 78 | 76.2 |
| Example 2-4 | 7.4 | 7.6 | 1.7 | 78 | 73.2 |
| Example 2-5 | 7.4 | 9.8 | 1.7 | 78 | 72.1 |
| Example 2-6 | 7.4 | 10.1 | 1.7 | 78 | 70.9 |
| Comparative example 1-1 | 7.4 | 5.8 | 7.4 | 147 | 52.3 |
| Comparative example 2-1 | 7.4 | 1.7 | 1.7 | 78 | 58.8 |

As shown in Table 2, in Examples 2-1 to 2-6 in which the surface roughness Rz of the exposed region 22S in which the anode lead 21 was provided was 1.7 μm and the surface roughness Rz of the covering region 22A was 1.8 μm or more, relatively favorable discharge capacity retention ratios were obtained. Meanwhile, in Comparative example 1-1 in which the surface roughness Rz was 7.4 μm, the resistance was increased and the discharge capacity retention ratio was lowered compared to Examples 1-1 to 1-8. In Comparative example 2-1, since the surface roughness Rz of the exposed region 22S was 1.7 low resistance was obtained as in Examples 2-1 to 2-6. However, in Comparative example 2-1, since the surface roughness Rz of the shine face of the covering region 22A was 1.7 μM, the contact characteristics between the anode current collector 22 and the anode active material layer 23 were not obtained sufficiently, and the discharge capacity retention ratio was lower than those of Examples 2-1 to 2-6. Further, as in Examples 1-1 to 1-8, it was found that there was a tendency that the discharge capacity retention ratio was improved as the surface roughness Rz of the shine face of the covering region 22A became larger from 1.8 μm; and the discharge capacity retention ratio was the maximum when the surface roughness Rz of the shine face of the covering region 22A was 5.8 μm; and then the discharge capacity retention ratio was gradually lowered when the surface roughness Rz of the shine face of the covering region 22A became larger than 5.8 μm.

Examples 3-1 to 3-3

Secondary batteries of Examples 3-1 to 3-3 were fabricated in the same manner as that of Example 1-5, except that the surface roughness Rz of the exposed region 22S was changed as shown in the following Table 3. For Examples 3-1 to 3-3, the discharge capacity retention ratio and the resistance were measured in the same manner as that of Example 1-5. The results are shown in Table 3 together with the result of Example 1-5.

TABLE 3

| | Surface roughness Rz of covering region | | Surface roughness Rz of exposed region (μm) | Resistance (mΩ) | Discharge capacity retention ratio (%) |
|---|---|---|---|---|---|
| | Mat face (μm) | Shine face (μm) | | | |
| Example 3-1 | 7.4 | 5.8 | 0.8 | 59 | 80.2 |
| Example 3-2 | 7.4 | 5.8 | 1.3 | 65 | 79.5 |
| Example 1-5 | 7.4 | 5.8 | 1.7 | 78 | 76.2 |
| Example 3-3 | 7.4 | 5.8 | 1.9 | 88 | 75.9 |

As shown in Table 3, as the surface roughness Rz of the exposed region 22S in which the anode lead 21 was provided became smaller, the resistance was decreased and the discharge capacity retention ratio was improved.

Example 4-1

A secondary battery of Example 4-1 was fabricated in the same manner as that of Example 1-5, except that when the exposed region 22S was planarized, the anode active material layer 23 was press-molded together therewith. For Example 4-1, the discharge capacity retention ratio and the resistance were measured in the same manner as that of Example 1-5. The results are shown in Table 4 together with the result of Example 1-5.

TABLE 4

| | Surface roughness Rz of covering region | | Surface roughness Rz of exposed region (μm) | Resistance (mΩ) | Press molding of anode active material layer | Discharge capacity retention ratio (%) |
|---|---|---|---|---|---|---|
| | Mat face (μm) | Shine face (μm) | | | | |
| Example 1-5 | 7.4 | 5.8 | 1.7 | 78 | N/A | 76.2 |
| Example 4-1 | 7.4 | 5.8 | 1.7 | 78 | Applicable | 78.3 |

As shown in Table 4, in Example 4-1 in which the anode active material layer 23 was press-molded concurrently when the exposed region 22S was planarized, a higher discharge capacity retention ratio was obtained compared to in Example 1-5. Its main contributing factor may be as follows. That is, by performing the press molding, the contact area between the anode current collector 22 and the anode active material layer 23 was increased, and the contact characteristics were improved.

Examples 5-1 to 5-5

Secondary batteries of Examples 5-1 to 5-5 were fabricated in the same manner as that of Example 1-5, except that the average particle diameter of the silicon particle as the conductive particle contained in the anode active material layer 23 was changed as shown in the following Table 5. For Examples 5-1 to 5-5, the discharge capacity retention ratio and the resistance were measured in the same manner as that of Example 1-5. The results are shown in Table 5 together with the result of Example 1-5.

TABLE 5

|  | Average particle diameter of silicon particle (μm) | Discharge capacity retention ratio (%) |
|---|---|---|
| Example 5-1 | 0.4 | 73.2 |
| Example 5-2 | 0.5 | 76.1 |
| Example 5-3 | 1.0 | 78.8 |
| Example 1-5 | 3.0 | 76.2 |
| Example 5-4 | 5.0 | 76.4 |
| Example 5-5 | 5.2 | 73.9 |

As shown in Table 5, it was found that in particular, when the average particle diameter was from 0.5 μm to 5.0 μm, a more favorable discharge capacity retention ratio was obtained.

Examples 6-1 and 6-2

Secondary batteries of Examples 6-1 and 6-2 were fabricated in the same manner as that of Example 1-5, except that the type of the binder contained in the anode active material layer 23 was polyamide imide (Example 6-1) and polyvinylidene fluoride (Example 6-2). In Example 1-5, as described above, thermoplastic polyimide was used. Secondary batteries as Comparative examples 6-1 to 6-3 were fabricated in the same manner as that of Examples 6-1, 6-2, and 1-5, except that an electrolytic copper foil (being 12 μm thick) with the surface roughness Rz of 1.7 μm over the whole area was used as the anode current collector. For Examples 6-1 and 6-2 and Comparative examples 6-1 to 6-3, the discharge capacity retention ratio was measured in the same manner as that of Example 1-5. The results are shown in Table 6 together with the result of Example 1-5.

TABLE 6

Surface roughness Rz of flat and smooth region = 1.7

|  | Surface roughness Rz of covering region | | Binder of anode active material layer | Discharge capacity retention ratio (%) |
|---|---|---|---|---|
|  | Mat face (μm) | Shine face (μm) | | |
| Example 6-1 | 7.4 | 5.8 | Polyamide imide | 79.7 |
| Example 6-2 | 7.4 | 5.8 | Polyvinylidene fluoride | 73.2 |
| Example 1-5 | 7.4 | 5.8 | Polyimide | 76.2 |
| Comparative example 6-1 | 1.7 | 1.7 | Polyamide imide | 59.3 |
| Comparative example 6-2 | 1.7 | 1.7 | Polyvinylidene fluoride | 52.1 |
| Comparative example 6-3 | 1.7 | 1.7 | Polyimide | 57.3 |

As shown in Table 6, based on comparison between Example 6-1 and Comparative example 6-1, between Example 6-2 and Comparative example 6-2, and between Example 1-5 and Comparative example 6-3, it was found that regardless of the binder type used, when the projection 222 was provided in the covering region 22A to increase the surface roughness Rz, the discharge capacity retention ratio could be improved.

Examples 7-1 to 7-5

Secondary batteries of Examples 7-1 to 7-5 were fabricated in the same manner as that of Example 1-5, except that the anode 20 was provided with heat treatment in the reduced pressure atmosphere before the spirally wound electrode body 30 was formed. The heat treatment conditions, that is, the heating temperature (deg C) and the heating time (h) are as shown in the following Table 7. For the prepared anode 20, the cross section was cut out, and the interface between the anode current collector 22 and the anode active material layer 23 was analyzed by AES (Auger Electron Spectroscopy). In the result, it was confirmed that copper component of the anode current collector 22 was diffused in the anode active material layer 23. That is, it was confirmed that the anode current collector 22 and the anode active material layer 23 were alloyed. For Examples 7-1 to 7-5, the discharge capacity retention ratio and the resistance were measured in the same manner as that of Example 1-5. The results are shown in Table 7 together with the result of Example 1-5.

TABLE 7

|  | Heat treatment conditions | | Discharge capacity retention ratio (%) |
|---|---|---|---|
|  | Heating temperature (deg C.) | Heating time (h) | |
| Example 1-5 | — | — | 76.2 |
| Example 7-1 | 300 | 10 | 77.7 |
| Example 7-2 | 400 | 10 | 78.9 |
| Example 7-3 | 500 | 10 | 80.6 |
| Example 7-4 | 600 | 10 | 80.2 |
| Example 7-5 | 700 | 10 | 67.2 |

As shown in Table 7, there was a tendency that as the heating temperature was increased, the discharge capacity retention ratio was increased. The reason thereof may be as follows. That is, by providing heat treatment at higher heating temperatures, the elemental diffusion between the anode current collector 22 and the anode active material layer 23 was promoted and the contact characteristics thereof were improved. Thus, separation and dropping between the anode current collector 22 and the anode active material layer 23 due to expansion and shrinkage of the anode active material layer 23 were prevented. In Example 7-5 in which the heating temperature was 700 deg C., the discharge capacity retention ratio was lower than that of Example 1-5 in which the heating temperature was not provided. The reason thereof may be the fact that $Cu_3Si$ with the relatively low strength was formed on the interface due to excessive diffusion, and thus the contact characteristics were lowered.

Examples 8-1 and 8-2

Secondary batteries of Examples 8-1 and 8-2 were fabricated in the same manner as that of Example 1-5, except that as a solvent used for the electrolyte, fluoroethylene carbonate (FEC) or difluoroethylene carbonate (DFEC) was used instead of ethylene carbonate. Secondary batteries of Comparative examples 8-1 to 8-3 were fabricated in the same manner as that of Examples 8-1, 8-2, and 1-5, except that an electrolytic copper foil (being 12 μm thick) with the surface roughness Rz of 1.7 μm over the whole face was used as the anode current collector. For Examples 8-1 and 8-2 and Comparative examples 8-1 to 8-3, the discharge capacity retention ratio was measured in the same manner as that of Example 1-5. The results are shown in Table 8 together with the result of Example 1-5.

TABLE 8

Surface roughness Rz of flat and smooth region = 1.7

| | Surface roughness Rz of covering region | | Electrolyte composition | | Discharge capacity retention ratio |
|---|---|---|---|---|---|
| | Mat face (μm) | Shine face (μm) | Material | Wt % | (%) |
| Example 8-1 | 7.4 | 5.8 | FEC | 30 | 85.3 |
| | | | Diethyl carbonate | 70 | |
| Example 8-2 | 7.4 | 5.8 | DFEC | 30 | 88.7 |
| | | | Diethyl carbonate | 70 | |
| Example 1-5 | 7.4 | 5.8 | Ethylene carbonate | 30 | 76.2 |
| | | | Diethyl carbonate | 70 | |
| Comparative example 8-1 | 1.7 | 1.7 | FEC | 30 | 53.9 |
| | | | Diethyl carbonate | 70 | |
| Comparative example 8-2 | 1.7 | 1.7 | DFEC | 30 | 58.6 |
| | | | Diethyl carbonate | 70 | |
| Comparative example 8-3 | 1.7 | 1.7 | Ethylene carbonate | 30 | 51.1 |
| | | | Diethyl carbonate | 70 | |

As shown in Table 8, based on comparison between Example 8-1 and Comparative example 8-1, between Example 8-2 and Comparative example 8-2, and between Example 1-5 and Comparative example 8-3, it was found that regardless of the solvent type used, when the projection 222 was provided in the covering region 22A to increase the surface roughness Rz, the discharge capacity retention ratio could be improved.

Example 9-1

A secondary battery of Examples 9-1 was fabricated in the same manner as that of Example 1-5, except that the anode active material layer 23 was formed by vapor-phase deposition method. As comparative example 9-1 relative to Example 9-1, a secondary battery was fabricated in the same manner as that of Example 9-1, except that the exposed region 22S was not press-molded by the rolling press machine, the high surface roughness was kept, and the anode lead 21 was welded therewith. As comparative example 9-2, a secondary battery was fabricated in the same manner as that of Example 9-1, except that the whole area of the anode current collector 22 was press-molded before the anode active material layer 23 was formed, and the surface roughness Rz of the both faces of the covering region 22A was also 1.7 μm. For the secondary batteries of Example 9-1 and Comparative examples 9-1 and 9-2, the discharge capacity retention ratio and the resistance were measured in the same manner as that of example 1-5. The results are shown in Table 9.

TABLE 9

| | Surface roughness Rz of covering region | | Surface roughness Rz of exposed region (μm) | Resistance (mΩ) | Discharge capacity retention ratio (%) |
|---|---|---|---|---|---|
| | Mat face (μm) | Shine face (μm) | | | |
| Example 9-1 | 7.4 | 5.8 | 1.7 | 56.8 | 83.2 |
| Comparative example 9-1 | 7.4 | 5.8 | 7.4 | 130.6 | 76.8 |
| Comparative example 9-2 | 1.7 | 1.7 | 1.7 | 56.8 | 20.3 |

As shown in Table 9, in Example 9-1 in which the surface roughness Rz of the exposed region 22S in which the anode lead 21 was provided was 1.7 μm and the surface roughness Rz of the covering region 22A was 1.8 μm or more, the resistance was decreased more than in Comparative example 9-1, and more favorable discharge capacity retention ratio than those of Comparative example 9-1 and Comparative example 9-2 was obtained.

As described above, according to the examples, by providing the projection 222 on the surface of the substrate 221, the contact characteristics between the anode current collector 22 and the anode active material layer 23 were improved, and separation of the anode active material layer 23 can be prevented. In addition, by providing the anode lead 21 in the exposed region 22S with the surface roughness smaller than that of the covering region 22A, the contact resistance between the anode current collector 22 and the anode lead 21 could be decreased, and in the result, the discharge capacity retention ratio could be improved.

The application has been described with reference to the embodiment and the examples. However, the application is not limited to the foregoing embodiment and the foregoing examples, and various modifications may be made. For example, in the foregoing embodiment and the foregoing examples, descriptions have been given of the secondary battery using the laminated film as the package member. However, the present application can be similarly applied to a secondary battery having other shape such as a cylinder type secondary battery and a square type secondary battery using a metal can as the package member. Further, descriptions have been given of the case that the anode, the cathode, and the separator structure the spirally wound electrode body. However, present application is not limited to the embodiments described above, and for example, a lamination type electrode body may be structured. Further, the electrode in am embodiment can be applied not only to the anode, but also to the cathode. Furthermore, the present application can be applied to primary batteries in addition to the secondary batteries.

In the foregoing embodiment and the foregoing examples, the surface roughness was changed by providing the projection on the surface of the substrate such as the electrolytic copper foil by electrolytic deposition method or the like. The method is not limited thereto, and the surface roughness can be changed by, for example, etching.

In the foregoing embodiment and the foregoing examples, descriptions have been given of the battery using lithium as an electrode reactant. However, present application can be also applied to the case using other alkali metal such as sodium and potassium, an alkali earth metal such as magnesium and calcium, or other light metal such as aluminum. In this case, for example, the anode active material similar to that of the foregoing embodiment can be used.

Furthermore, in the foregoing embodiment and the foregoing examples, for the parameters such as the surface roughness of the current collector and the average particle diameter of the conductive particle in the active material layer, the appropriate ranges derived from the results of the examples have been described. Such a description does not totally deny a possibility that each parameter might be out of the foregoing range. That is, the foregoing appropriate ranges are particularly preferably ranges to obtain the effects of the application. As long as the effects of the application can be obtained, each parameter may be slightly out of the foregoing range.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electrode comprising:
a current collector including a surface comprising an active-material-layer-formation region and a flat and smooth region, the flat and smooth region of the surface having a surface roughness smaller than that of the active-material-layer-formation region of the surface; and
an active material layer provided in the active-material-layer-formation region of the surface; and
an electrode lead provided on the flat and smooth region having a surface roughness smaller than that of the active-material-layer-formation region of the surface,
wherein the active material layer contains silicon.

2. The electrode according to claim 1, wherein the active-material-layer-formation region of the surface has a particulate projection.

3. The electrode according to claim 2, wherein the particulate projection is formed by electrolytic deposition method.

4. The electrode according to claim 2, wherein an average diameter of the particulate projection ranges from 50 nm to 5 µm.

5. The electrode according to claim 1, wherein ten point height of roughness profile Rz in the active-material-layer-formation region of the surface is from 1.8 µm to 10.0 µm, and ten point height of roughness profile Rz in the flat and smooth region of the surface is 1.7 µm or less.

6. The electrode according to claim 1, wherein the electrode lead is made of a metal material containing nickel.

7. The electrode according to claim 1, wherein the current collector contains copper or a copper alloy.

8. The electrode according to claim 1, wherein the active material layer is formed on both faces of the current collector.

9. The electrode according to claim 1, wherein the current collector and the active material layer are alloyed in at least part of an interface thereof.

10. The electrode according to claim 1, wherein the active material layer contains a mixture of a conductive particle containing silicon and a binder.

11. The electrode according to claim 10, wherein an average particle diameter of the conductive particle in the active material layer is from 0.5 µM to 5.0 µm.

12. The electrode according to claim 10, wherein the active material layer contains at least one of a thermoplastic resin and a thermosetting resin as the binder.

13. The electrode according to claim 10, wherein the active material layer contains a thermoplastic resin with hydrogen bonding and at least one thermosetting resin selected from the group consisting of an epoxy resin, a phenol resin, polyimide, polyurethane, a melamine resin, and a urea resin as the binder.

14. The electrode according to claim 1, wherein the active material layer does not exist in the flat and smooth region of the surface.

15. The electrode according to claim 1, wherein the electrode lead is formed of a metal material selected from the group consisting of aluminum, copper, nickel and stainless steel.

16. The electrode according to claim 1, wherein the flat and smooth region of the surface includes a first projection, and the active-material-layer-formation region of the surface includes a second projection, and a height of the first projection is less than a height of the second projection.

17. A battery comprising a cathode, an anode, and an electrolyte,
wherein at least one of the cathode and the anode includes:
a current collector including a surface comprising an active-material-layer-formation region and a flat and smooth region, the flat and smooth region of the surface having a surface roughness smaller than that of the active-material-layer-formation region of the surface; and
an active material layer provided in the active-material-layer-formation region of the surface, and
an electrode lead provided on the flat and smooth region having a surface roughness smaller than that of the active-material-layer-formation region of the surface, and
wherein the active material layer contains silicon.

18. The battery according to claim 17, wherein the active-material-layer-formation region of the surface has a particulate projection.

19. The battery according to claim 18, wherein the particulate projection is formed by electrolytic deposition method.

20. The battery according to claim 17, wherein ten point height of roughness profile Rz in the active-material-layer-formation region of the surface is from 1.8 µm to 10.0 µm, and ten point height of roughness profile Rz in the flat and smooth region of the surface is 1.7 µm or less.

21. The battery according to claim 17, wherein the electrode lead is made of a metal material containing nickel.

22. The battery according to claim 17, wherein the current collector contains copper or a copper alloy.

23. The battery according to claim 17, wherein the active material layer is formed on both faces of the current collector.

24. The battery according to claim 17, wherein the current collector and the active material layer are alloyed in at least part of an interface thereof.

25. The battery according to claim 17, wherein the active material layer contains a mixture of a conductive particle containing silicon and a binder.

26. The battery according to claim 25, wherein an average particle diameter of the conductive particle in the active material layer is from 0.5 µm to 5.0 µm.

27. The battery according to claim 25, wherein the active material layer contains at least one of a thermoplastic resin and a thermosetting resin as the binder.

28. The battery according to claim 25, wherein the active material layer contains a thermoplastic resin with hydrogen bonding and at least one thermosetting resin selected from the group consisting of an epoxy resin, a phenol resin, polyimide, polyurethane, a melamine resin, and a urea resin as the binder.

29. The battery according to claim 17, wherein the electrolyte contains a solvent containing at least one of chain ester carbonate and cyclic ester carbonate.

30. The battery according to claim 29, wherein the chain ester carbonate includes at least one of fluoromethyl methyl carbonate, bis(fluoromethyl) carbonate, and difluoromethyl methyl carbonate, and the cyclic ester carbonate contains at least one of 4-fluoro-1,3-dioxolane-2-one and 4,5-difluoro-1,3-dioxolane-2-one.

31. The battery according to claim 17, wherein the active material layer does not exist in the flat and smooth region of the surface.

32. The battery according to claim 17, wherein the electrode lead is formed of a metal material selected from the group consisting of aluminum, copper, nickel and stainless steel.

* * * * *